United States Patent
Carter, Jr. et al.

(10) Patent No.: US 7,381,366 B2
(45) Date of Patent: Jun. 3, 2008

(54) APPARATUS FOR THE PRODUCTION OR REFINING OF METALS, AND RELATED PROCESSES

(75) Inventors: William Thomas Carter, Jr., Galway, NY (US); Mark Gilbert Benz, Lincoln, VT (US); Clifford Earl Shamblen, Blue Ash, OH (US); Andrew Philip Woodfield, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 680 days.

(21) Appl. No.: 10/749,893

(22) Filed: Dec. 31, 2003

(65) Prior Publication Data

US 2005/0145065 A1    Jul. 7, 2005

(51) Int. Cl.
    *C21C 1/00*      (2006.01)
(52) U.S. Cl. ............ 266/202; 266/239; 266/241
(58) Field of Classification Search ........... 266/200, 266/239, 202, 241
    See application file for complete search history.

(56) References Cited

U.S. PATENT DOCUMENTS

| | | | |
|---|---|---|---|
| 4,185,682 A | 1/1980 | Ksendzyk et al. | |
| 4,838,340 A | 6/1989 | Entrekin et al. | |
| 4,932,375 A | 6/1990 | Harker | |
| 4,936,635 A | 6/1990 | Harker | |
| 4,961,776 A | 10/1990 | Harker | |
| 5,160,532 A | 11/1992 | Benz et al. | |
| 5,222,547 A | 6/1993 | Harker | |
| 5,224,534 A * | 7/1993 | Shimizu et al. | 164/469 |
| 5,263,689 A | 11/1993 | Menzies et al. | |
| 6,001,495 A | 12/1999 | Bristow et al. | |
| 6,074,545 A | 6/2000 | Ginatta | |
| 6,375,702 B1 | 4/2002 | Knudsen et al. | |
| 6,712,875 B1 * | 3/2004 | Jackson et al. | 266/200 |

OTHER PUBLICATIONS

"Direct Electrochemical Reduction of Titanium Dioxide to Titanium in Molten Calcium Chloride", G. Z. Chen et al, Letters to Nature, Nature, vol. 407, Sep. 21, 2000, pp. 361-364.
"Recycling of Superalloy Scrap Through Electro Slag Remelting", VV Satya Prasad et al , ISIJ International, vol. 36, No. 12, 1996, pp. 1459-1464, Dec. 1996.

* cited by examiner

*Primary Examiner*—Scott Kastler
(74) *Attorney, Agent, or Firm*—Francis T. Coppa; Patrick K. Patnode (57) ABSTRACT

An electroslag-cold hearth (ESCH) system for refining or producing a desired metal or metal alloy is described. The system includes at least one cold hearth vessel capable of holding a pool of molten liquid metal and an overlying slag layer, and an ingot mold laterally off-set from the cold hearth. A source of raw material, e.g., a feed electrode, is positioned above the cold hearth, and fed into the molten slag in a refining operation. A flow-over dam separates the ingot mold from the cold hearth, preventing the flow of inclusions and other foreign bodies into the ingot mold. In some instances, a non-consumable electrode provides additional thermal energy to the slag. In the production operation, the metal source can be a salt from which the desired metal can be electrochemically extracted. Related methods for refining or producing metals such as titanium alloys are also described.

29 Claims, 9 Drawing Sheets

APPARATUS FOR THE PRODUCTION OR REFINING OF METALS, AND RELATED PROCESSES

BACKGROUND OF THE INVENTION

This invention relates generally to the processing of metals. More specifically, the invention is directed to processes and systems for the production or refining of specialty metals, such as titanium, aluminum, nickel, and their alloys.

Various metals and metal alloys are used to form relatively large structures which are used in demanding industrial applications. As an example, nickel-based superalloys are often used to form large turbine rotors and blades. Titanium alloys are frequently used for components in the cold section of a turbine, e.g., fan disks, fan blades, compressor discs, and compressor blades. They are also used to fabricate other types of high-value products. For example, a medical prosthesis can be cast or forged from a titanium material.

Specialty metals used for larger components are often produced as large bodies, using a sequence of processing techniques, such as vacuum induction melting, electroslag refining, and vacuum arc remelting. As an example, premium titanium alloys for aircraft engine applications are often formed by a process which includes cold-hearth melting of a titanium-based raw material, followed by one or more additional remelting steps, using vacuum arc remelting.

While the metal produced by these techniques is quite valuable, the processing through several steps can be expensive and time-consuming. For example, cold hearth melting systems usually employ a set of plasma torches or electron-beam guns to melt the raw metal feed material, and keep it in a molten state during processing. This type of equipment is very expensive to purchase, and requires a very high energy expenditure.

Considering their cost, the purity and quality of these specialty metals and metal alloys is often critical. Thus, special attention is paid to eliminating various impurities and foreign bodies from the metal product, e.g., an ingot. For example, hard alpha inclusions, which comprise titanium interstitially enriched with one or more of oxygen, nitrogen, or carbon, sometimes appear in titanium ingots. (Similarly, a variety of defects can sometimes appear in ingots formed of superalloys or other types of alloys). These defects, which are often introduced during the primary forming processes, can serve as initiation sites for points of weakness and potential failure of articles formed from the ingot.

The elimination or minimization of such defects remains a significant challenge to manufacturers, processors, and users. For example, nitrogen-rich inclusions generally form during the manufacture of virgin titanium, such as titanium sponge. Once formed, they must be removed or minimized during subsequent processing, sorting, or remelting operations. Fragmenting of the sponge into very small pieces may ameliorate the problem somewhat. The use of melting techniques which increase treatment time in the liquid state are also helpful. Still, efforts to-date have not always eliminated the presence of these defects.

In the case of titanium alloys, nitrogen-rich inclusions melt in a range above the melting range of titanium metal itself. The density of the inclusions is greater than the density of titanium metal and titanium alloys. Thus, removal of the inclusions by melting or floating is not practical. Dissolving of the nitrogen-rich inclusions in liquid titanium is very slow, but is currently the only practical solution. Hearth melt processing must be run very carefully and slowly to allow for density separation of the inclusions into the skull, or for redistribution of the interstitial element concentration by dissolution.

Another major source of defects in titanium-based articles is the presence of inclusions or contaminants of high-density or titanium-insoluble species. These contaminants are often tungsten-containing or other refractory compositions picked up during the recycle, recovery, and processing of titanium and titanium alloy scrap, also referred to herein as "revert." For example, the undesirable materials are sometimes introduced during cutting processes which use torches or other cutting tools, and can be in the form of drill bits, saw blade teeth, cutting torch electrodes, and the like. The problem of removing these types of contaminants is especially difficult. Since they often have melting points well above that of titanium, heat treatments may be ineffective or impractical. Instead, they may have to be removed by other techniques, such as electron beam cold hearth remelting.

When metals like titanium are refined in an electroslag process, the product is very accessible to contaminants like those described above. For example, the inclusions and contaminants can fall off a melting feed-ingot and pass through an underlying layer of slag. They then become readily incorporated into the ingot product being formed in a mold below the slag.

As mentioned above, this invention also relates to the production of specialty metals. Titanium is a good example, since it is often used in alloys intended for critical applications. Commercial methods for obtaining titanium from various ores are well-known. Examples include chlorination of titanium ore to produce titanium tetrachloride, followed by reduction of titanium tetrachloride with sodium (the Hunter process), or with magnesium (the Kroll process).

Metals like titanium can also be produced in an electrolytic process, as described in U.S. Pat. No. 6,074,545 (Ginatta). In such a process, a vertically-disposed copper cylinder functions as the crucible, and a liquid metal pool serves as the cathode. The crucible is usually water-cooled, and also includes a base plate which is connected to a power supply. A graphite anode is positioned within the interior of the cylinder. The anode is also connected to the power supply, through a bus bar. The crucible contains molten-salt electrolyte (calcium or calcium compounds), which is analogous to the slag employed in an electroslag refining process. The electrolyte is maintained in a molten state by resistance-heating with electricity, originating at the power supply.

The compounds which contain the metal to be extracted are directed into the electrolyte by a conventional feeding mechanism. The feed compounds may be in either solid, liquid, or gaseous form. (In the case of titanium alloys, examples of the compounds are $TiCl_4$, $TiF_3$, $TiBr_4$, $AlCl_3$, $VCl_4$, $VCl_3$, $VCl_2$, and the like.). As the feed compounds are reduced by electrolysis, gaseous byproducts are removed through a duct inside the anode. The product, e.g., titanium metal, is collected as a molten liquid at the cathode. A pool of the liquid is allowed to cool and solidify as an ingot within the cathode-mold. The ingot can be withdrawn by lowering a retractable base plate.

Electrolytic processes like those described in Ginatta may be very useful for producing titanium and other specialty metals. The Ginatta process, in particular, appears to be potentially capable of directly producing premium-grade titanium directly from raw materials like $TiCl_4$. This technique can be a considerable processing advantage, in that it may allow one to bypass other complex steps related to titanium sponge formation and reconsolidation.

However, such processes still exhibit some of the serious drawbacks described previously. For example, the vertical alignment of Ginatta's melting and recrystallization stations would still permit inclusions and other impurities to pass directly from the anode chamber into the body of liquid metal which cools to become the product. This problem is especially acute when the raw material includes metal revert and other solid materials. Additional, time- and energy-consuming steps like remelting may therefore be required to eliminate inclusions and foreign bodies, as mentioned above.

With these concerns in mind, improvements in the way that titanium and other metals are produced and refined would be welcome in the art. The new techniques should be capable of efficiently reducing or eliminating inclusions and other impurities from the metal being refined or produced. For example, the removal of the foreign bodies should take place without the need for multiple re-melting stations, or other processing steps. Furthermore, the new processes should minimize the need for expensive heating equipment, like plasma torches or electron-beam guns. Moreover, the processes should be amenable to control mechanisms which can monitor and adjust critical parameters like melting temperature and electrical impedance. Finally, the processes should be compatible with other steps typically involved in metal production and refining, e.g., raw material processing or post-production stages like casting and forging.

BRIEF DESCRIPTION OF THE INVENTION

One embodiment of the invention is directed to an electroslag-cold hearth (ESCH) system for refining or producing a metal or metal alloy. The system includes at least one cold hearth vessel capable of holding a pool of molten liquid metal and an overlying slag layer. A source of raw material, e.g., a feed electrode, is positioned above the cold hearth, and fed into the molten slag. An ingot mold is laterally off-set (i.e., out of vertical alignment) from the cold hearth and the feed electrode.

The ingot mold is connected to the cold hearth by some type of passageway, which includes a flow-over dam or weir. The dam allows the liquid metal to flow from the hearth to the ingot mold, while preventing the passage of inclusions and other foreign bodies. In this manner, the refined ingot can be substantially free of inclusions and other impurities which could otherwise exist as defects in the final product, or serve as initiation sites for such defects.

A specific, illustrative ESCH system of this type comprises:
 a) at least one cold hearth vessel for melting and holding a pool of molten liquid metal;
 b) a liquid slag layer situated above the pool of metal in the cold hearth vessel;
 c) at least one source of the metal positioned above the liquid slag layer;
 d) an ingot mold for receiving molten metal from the pool of molten metal in the cold hearth vessel, laterally off-set from the source of the metal and situated below a portion of the slag layer;
 e) at least one power supply for electrically heating the slag layer; and
 f) a flow-over dam, separating the cold hearth vessel from the ingot mold.

The source of raw material is often a consumable electrode formed of a material which includes the metal or metal alloy of interest. (For the purpose of brevity for this disclosure, the term "metal" is meant to encompass both metals and metal alloys). In a refining process, the source of raw material often comprises metal revert. The liquid slag layer is usually calcium-based.

The power supply usually includes an electric supply means adapted to supply current to the liquid slag layer, through the consumable electrode. In this manner, the slag can be maintained in a molten state while the feed material is introduced thereto. As described below, the power supply may be operated in a variety of modes.

Other embodiments of the ESCH system include a second power supply, which can also be used for heating the slag, and/or providing power to other components of the system. The second power supply may be routed through one or more non-consumable electrodes which contact the slag layer. In some instances, the non-consumable electrode is mounted on a structure which allows it to move vertically, relative to the slag layer.

The ESCH system described herein can be used to refine or produce a wide variety of metals and metal alloys. Many of them are described below. Titanium and its alloys are of considerable interest for introduction to such a system. When producing a metal or metal alloy according to this invention, the metal source usually includes at least one raw material precursor from which the desired metal or metal alloy can be electrochemically (e.g., electrolytically) extracted, such as $TiCl_4$.

Another embodiment of the invention encompasses a method for refining a metal in an electroslag-cold hearth system. The method includes the following steps:
 (I) melting a source of the metal to form a pool of molten metal, by contacting the source with an underlying molten slag contained in a cold hearth vessel;
 (II) directing the pool of molten metal from the cold hearth vessel and over a flow-over dam, to an ingot mold which is laterally off-set from the source of the metal; and
 (III) cooling and solidifying the refined metal in the ingot mold.

A method of producing a metal from at least one raw material-source of the metal is also described. In either instance, the product can be made substantially free of the undesirable components described previously.

Moreover, another embodiment of the invention is directed to an ESCH system which includes both a refining operation and a production operation. As described below, the refining operation involves the melting of a feed electrode in a liquid slag layer (and utilizing the off-set ingot mold). The production operation involves the electrolytic production of the desired metal or alloy from a raw material source, e.g., a halide form of the metal.

Further details regarding the various features of this invention are found in the remainder of the specification, and in the accompanying drawings.

DETAILED DESCRIPTION OF THE INVENTION

Figure 1:
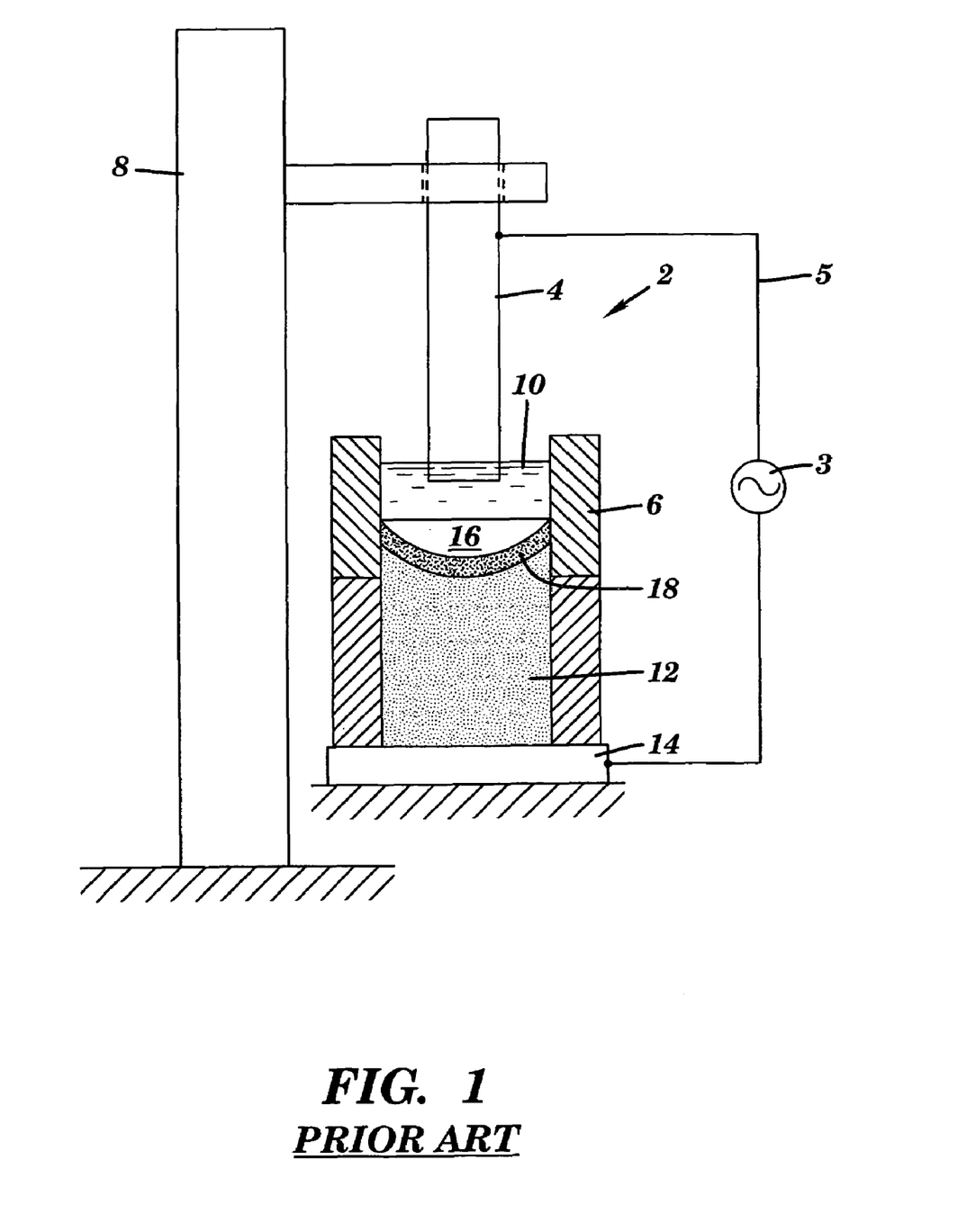
FIG. 1 is a schematic illustration of a conventional electroslag melting system of the prior art.

FIG. 1 is a schematic representation of a portion of a conventional electroslag melting system 2. The system includes a consumable electrode 4 of the metal or alloy to be melted; along with an ingot mold 6 (usually a water-cooled reservoir). The system also includes an electrode support column 8. Ingot mold 6 contains a layer of liquid slag 10, into which the lower end of electrode 4 dips. Electrode 4 can be advanced toward and into contact with slag 10 by any mechanical means (not specifically shown). The rate of advancement usually corresponds to the rate at which the contacting surface of the electrode is melted as refining proceeds. The electroslag melting system can be generally contained within an inert atmosphere (e.g., argon), to control melt conditions.

The slag is heated by an electric current supplied by a power source 3 and associated circuit 5, which includes electrode 4. Heating of the slag causes the lower end of electrode 4 to melt, forming the pool of liquid metal 16. (An associated skull of solidifying metal 18 usually forms at the bottom of the pool.) The amount of current needed to heat the slag will depend on the particular materials; the dimensions of the electrode and ingot; and the type of apparatus used. It is usually in the range of about 2,000 amperes to about 30,000 amperes. In the heating process, the metal droplets melt off consumable electrode 4 at the slag-metal interface. The droplets fall through the slag directly into liquid metal pool 16, where they cool and solidify into product-ingot 12. The ingot is supported by platform 14, which may or may not be retractable.

Figure 2:
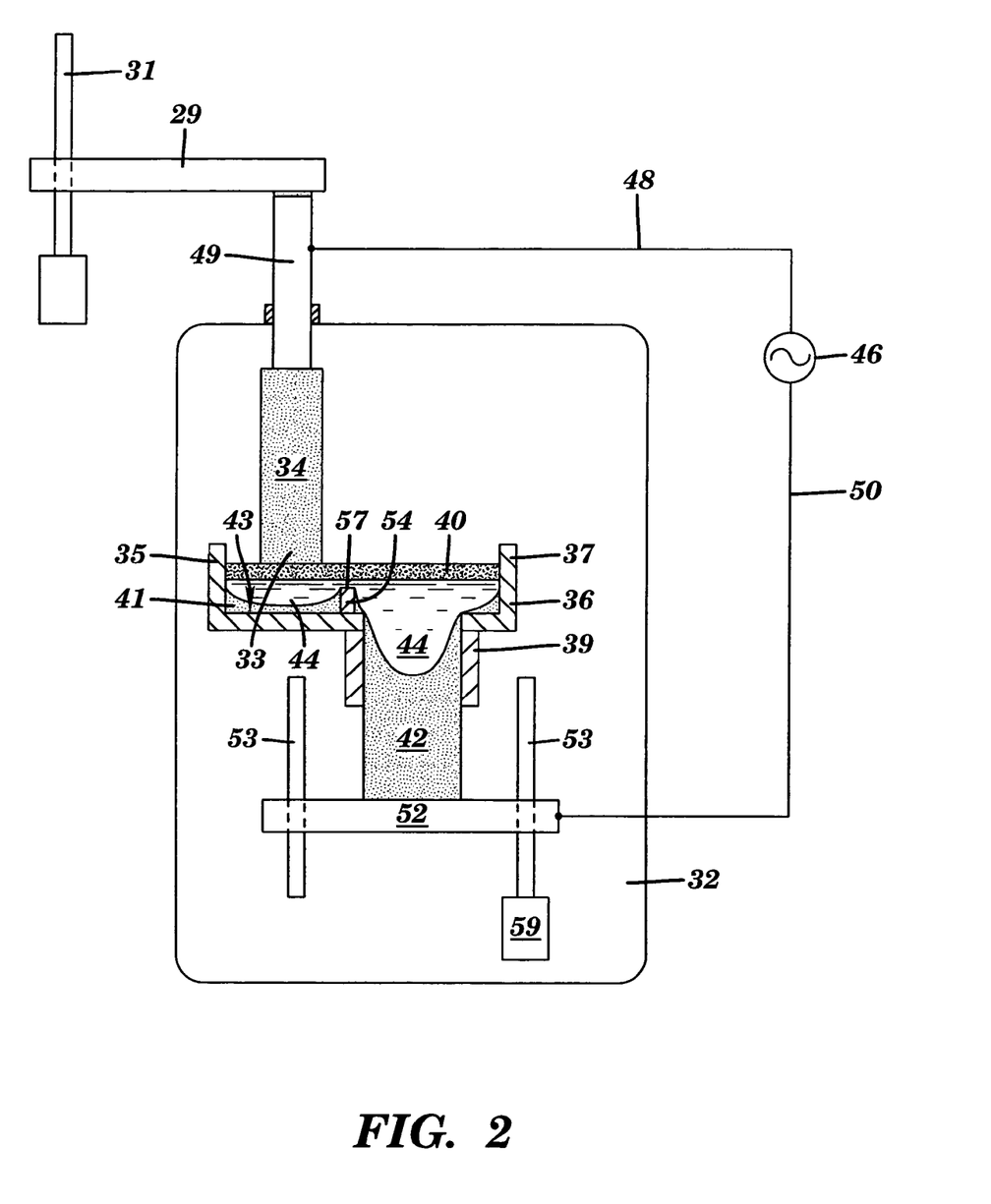
FIG. 2 is a schematic illustration of an electroslag-cold hearth apparatus of the present invention.

FIG. 2 is a schematic representation of one embodiment of the electroslag-cold hearth (ESCH) system of the present invention. The ESCH system is usually contained within some type of chamber 32. The chamber usually provides the system with an inert atmosphere, e.g., one filled with an inert gas such as argon. The inert atmosphere often permits better control of melting conditions.

The system includes a source of metal, in the form of consumable electrode 34. The shape of the electrode is not critical to this invention, and depends in part on its composition; the manner in which it was formed; and the shape of the cold hearth vessel, described below. Very often, consumable electrode 34 is formed as an ingot casting, and is substantially cylindrical. It can be welded (for example, by plasma welding), clamped, or attached by any other suitable means to sting 49. The electrode can be controllably raised and lowered by any suitable mechanism, e.g., electrode drive 31, which is connected to shaft or sting 49 through strut 29. (Strut 29 is electrically isolated from sting 49).

The ESCH system also includes a hearth 35, which is capable of holding liquid metal (which is melted from the electrode), along with liquid slag material. Hearths suitable for this purpose are known in the art, and described, for example, in U.S. Pat. No. 6,001,495, which is incorporated herein by reference. The hearth can be formed from a variety of materials. Copper or a copper alloy is often used when the metal being refined or produced is one having a relatively high melting temperature, such as titanium. Since hearth 35 is usually cooled during operation of the ESCH, it is often referred to as a "cold hearth". Various cooling mechanisms are possible, and need not be specifically described herein. As one non-limiting example, the hearth could incorporate interior channels that carry water to cool the hearth, and prevent it from melting. The size of the hearth will also depend on various factors, such as the overall dimensions of the ESCH system, and the size of consumable electrode 34.

Hearth 35 contains molten slag 40. The slag usually floats on top of the pool of liquid metal 44, as shown in the figure. The slag is maintained at a very high temperature, i.e., one sufficient to melt the lower portion 33 of consumable electrode 34. For example, when the consumable electrode is formed of titanium or a titanium alloy, the slag is usually maintained at a temperature in the range of about 1700° C. to about 2200° C.

Different methods for heating the slag are possible. In this instance, electric current from power supply 46 is the heating source. The current (usually alternating current in this embodiment) can be fed to the slag from conductor 48, through sting 49 and consumable electrode 34. Current flows from the electrode to slag 40 and liquid metal pool 44. The current then flows to the growing ingot 42 and ingot base-plate 52. Conductor 50 carries current from ingot base-plate 52, to complete the electrical circuit. Other details regarding heating techniques (e.g., electric power control mechanisms) are known in the art, and need not be described in detail here. (U.S. Pat. No. 5,160,532 (Benz et al) provides some relevant information, and is incorporated herein by reference).

The electric current is usually alternating current (AC) in this embodiment. However, in general, the power supply for the present invention may be operated as AC, DC (direct current), or some combination of the two modes. For example, the power supply could be switched between AC and DC, or operated as AC, with a DC off-set. (The power supply is usually in the DC mode for the electrolytic embodiments discussed below).

Slag 40 can perform several functions in the ESCH system. The electroslag is a high temperature medium which melts consumable electrode 34, as mentioned above. The slag also serves as the medium in which oxide and nitride inclusions are dissolved. Oxide inclusions will remain in the slag, while nitride inclusions will sink into the melting hearth skull or redissolve in the metal being refined, e.g., the titanium.

Choice of a particular slag composition will depend in part on the metal being refined or produced, and on the slag-functions described above. In the case of titanium or titanium alloys, the slag composition often comprises one or more calcium-based compounds (including calcium metal itself). Non-limiting examples of the calcium compounds include calcium halides such as calcium chloride and calcium fluoride, as well as calcium oxide. Some of the other typical components of the slag are magnesia, alumina, and silica. A slag skull 41 often forms on the inside surface 43 of hearth 35. The skull is formed because of the cooling influence of the coolant (not shown) flowing against (or within) hearth wall 37.

Figure 3:
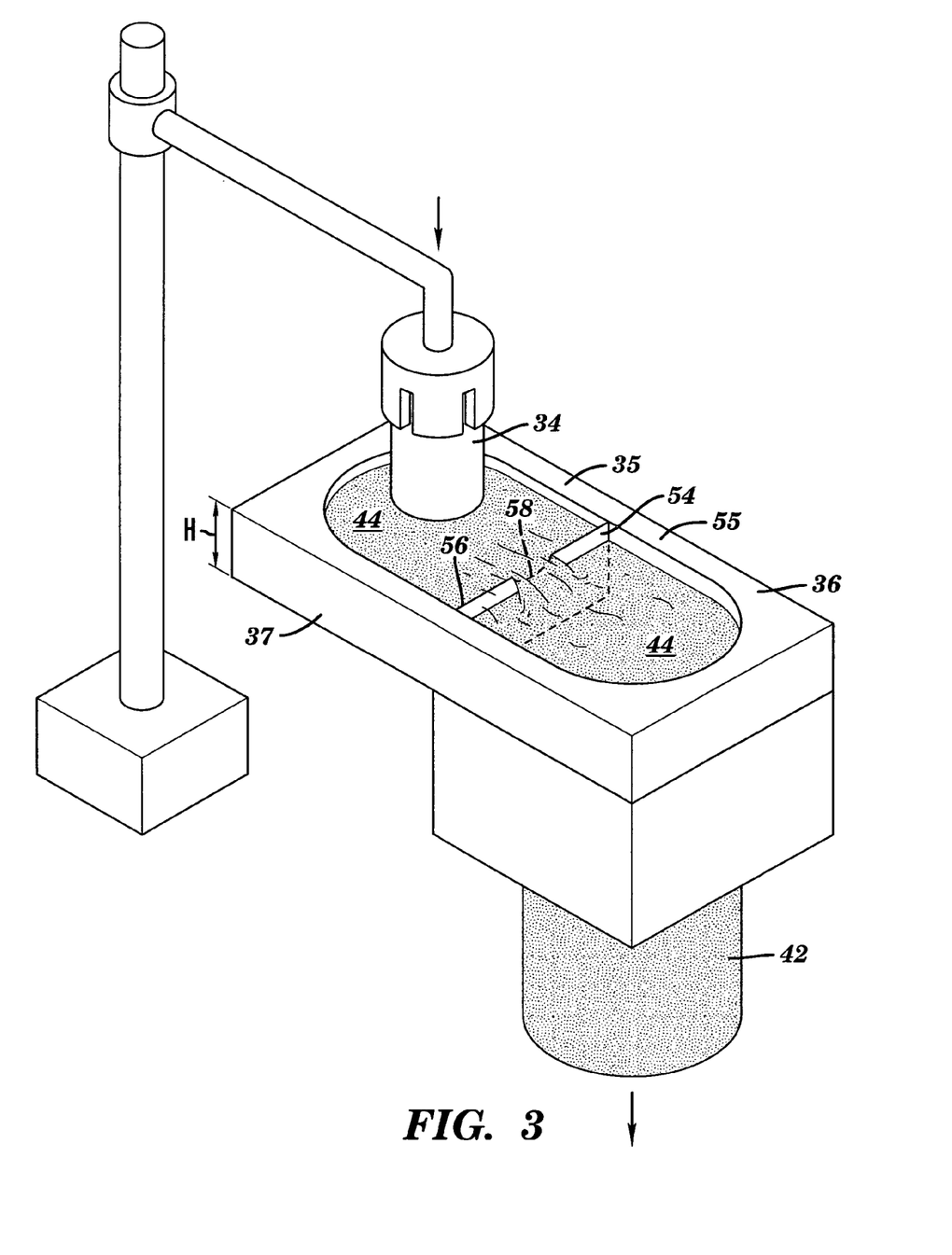
FIG. 3 is a perspective view of a portion of the electroslag-cold hearth apparatus of FIG. 2.

The ESCH system further includes ingot mold 36. The shape of the ingot mold and the material from which it is formed may be similar to hearth 35. (As shown in FIGS. 2 and 3, the ingot mold may in fact constitute one portion or side of a single vessel, in which the cold hearth vessel constitutes an opposite side). Often, the mold is fabricated from copper, and has dimensions sufficient for providing a desired shape for the solidifying ingot-product. Mold 36 can be a metal cylinder. The cylinder is open-ended at its lower end, terminating with lower section 39. This arrangement allows solidification of metal ingot 42 as it is formed. As described below, retractable base-plate 52 would be lowered as the growing ingot cools and solidifies.

Mold 36 can also be cooled by a variety of techniques. Some are described in U.S. Pat. No. 6,074,545 (Ginatta), which is incorporated herein by reference. For example, a jacket could be fabricated around the outer circumference of the mold, to allow for the circulation of cooling water.

Ingot mold 36 is separated from hearth vessel 35 by a flow-over dam 54. Liquid metal from liquid metal pool 44 is allowed to flow over the top 57 of the dam, and into ingot mold 36. However, the dam effectively prevents high-density inclusions from entering the ingot mold. Instead, the inclusions settle at or near the bottom of hearth 35.

The flow-over dam can be in a variety of shapes and sizes, as long as it serves as a barrier to most or all of the inclusions and other impurities described previously. FIG. 3 is a top perspective of a portion of the ESCH system of FIG. 2. Molten slag 40, which would lie over liquid metal 44, is not shown in the figure, so that the underlying features can be more easily seen. In this particular illustration, flow-over dam 54 is one of the walls 37 of hearth 35, which is adjacent to a wall section 55 of ingot mold 36. The dam can be formed of a metal such as copper, and can be cooled by one of the techniques described previously. The top surface 56 of the dam can include a notch or channel 58, through which liquid metal flows from the hearth to the ingot mold. The dimensions of the channel will depend on various factors, such as the viscosity of the liquid metal and the alloy used for the dam. Channel 58 is optional, however, since in many instances, the liquid metal will flow over most or all of surface 56, into mold 36.

In the illustrated embodiment presented in FIG. 3, the height "H" of the hearth wall 37 depends in part on the desired depth of hearth 35. The hearth often (but not always) has a depth which is about 3 inches (7.6 cm) to about 10 inches (25.4 cm). The thickness of the dam, i.e., the wall thickness of the hearth, depends in part on the type of slag and molten metal it is designed to contain. As an example for an industrial setting in which titanium-based consumable electrodes might weigh about 1000 kg to about 10,000 kg, the thickness of a copper-based dam may range from about 4 cm to about 20 cm. Those skilled in the art can readily modify the dimensions of the dam to satisfy a particular set of operating conditions (e.g., thermal load considerations), based on these teachings.

As mentioned above, the dam can have a variety of shapes. For example, it may be generally in the form of a substantially straight wall, as depicted in FIG. 3. Alternatively, it may be curved, e.g., if the wall of hearth vessel 35 is curved. (It should be understood that the hearth and the ingot mold can be vessels separate from each other, or can be a single vessel which is divided into two sections by way of the dam, as mentioned above).

FIGS. 2 and 3 illustrate a primary feature of the present invention, in terms of the relative positions of hearth 35 and ingot mold 36. The ingot mold is laterally off-set from the hearth (and, therefore, from the consumable electrode situated above the hearth). The degree to which ingot mold 36 is off-set can vary, as long as no part of consumable electrode 34 is located directly over mold 36. Thus, any insoluble or slow-dissolving inclusions which originate in electrode 34 and fall through the slag will not fall directly into the ingot mold, as in the prior art embodiment of FIG. 1. The inclusions will instead be generally trapped in the hearth.

As mentioned previously, the ingot 42 is formed as the liquid metal flowing from the hearth into mold 36 cools and begins to solidify. With reference to FIG. 2, ingot base-plate 52 is designed to accommodate the growth of the ingot-product. A variety of mechanisms can be used to lower the base-plate. As a non-limiting example, the base plate can be mounted on a suitable travel mechanism, e.g., a ball screw or a lead screw, generally depicted as element 53. The travel mechanism can be driven by motor 59, which is connected to any suitable power source (not shown). As another alternative, the structure from which the ingot product is being formed could be controllably raised. For example, hearth 35 and ingot mold 36 could be raised by a suitable mechanism, thereby accommodating the growth of the ingot.

Figure 4:
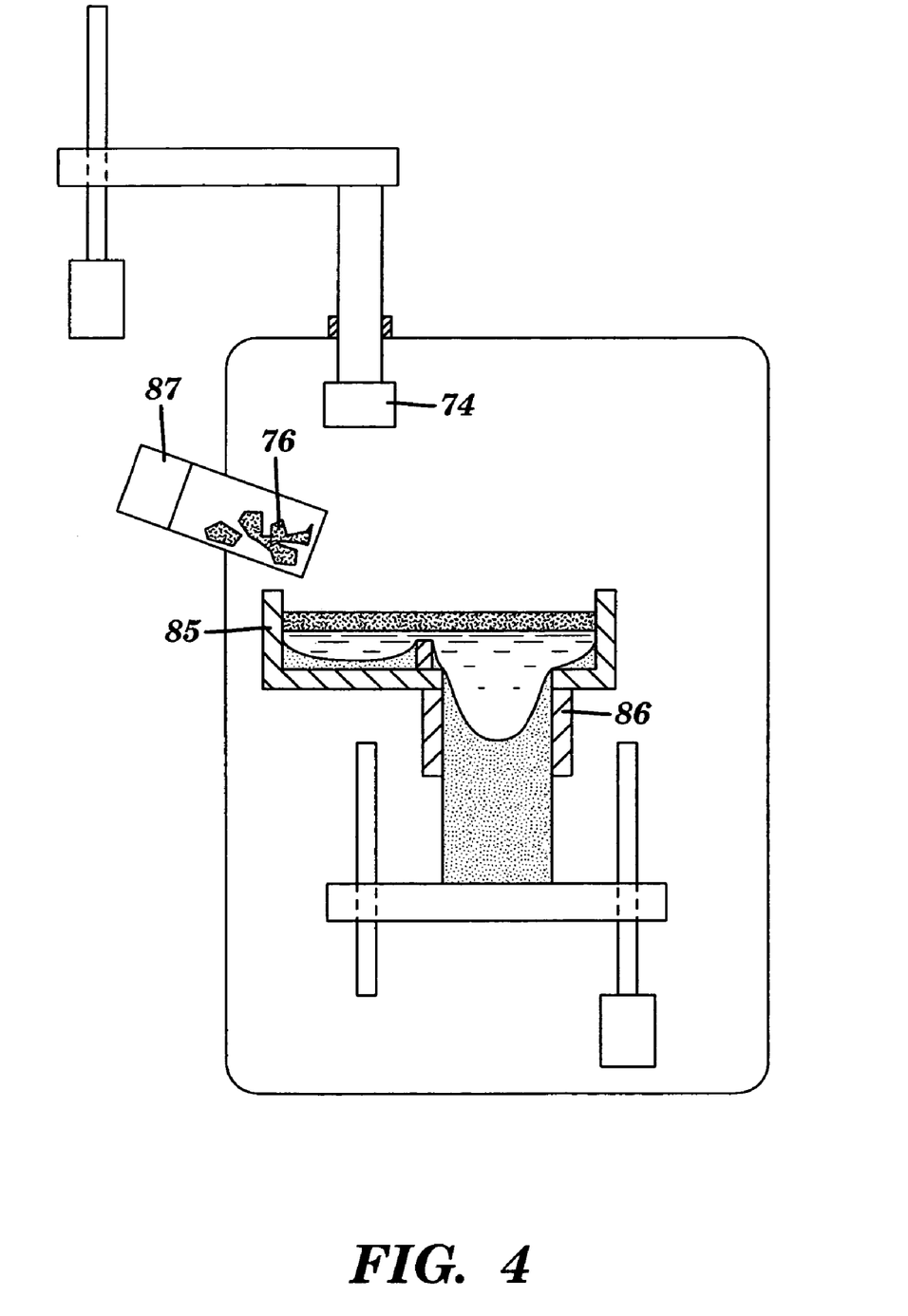
FIG. 4 is a schematic illustration of another embodiment of the electroslag-cold hearth apparatus.

As briefly mentioned above, the metal source does not have to be in the form of an ingot (e.g., consumable electrode 34) or other mass, as depicted in FIGS. 2 and 3. Instead, discrete pieces of metal can be used, e.g., revert metal. This embodiment is depicted in FIG. 4. (Many of the features of the ESCH system of FIG. 4 are identical to that of the previous embodiment, and need not be described in detail again.) Consumable electrode 74 is not used in this embodiment. Instead, solid metal pieces 76 are fed into hearth 85 by any convenient feeding station 87. As in FIGS. 2 and 3, ingot mold 86 is laterally off-set from the hearth. In this embodiment, various techniques for heating the slag would be possible, e.g., the use of a non-consumable electrode, as described below.

The form and type of revert metal may vary considerably. In the case of titanium, for example, the revert may comprise previously-used titanium fragments, particulates, production revert, virgin titanium (such as titanium sponge), or any combination of such materials. Superalloy revert is often in the form of used parts; machined material, e.g., turnings and borings; and discarded ingots.

Moreover, those skilled in electroslag refining are familiar with other factors which may be relevant here, such as revert size, revert feed rate, electrical voltage and power, hearth dimensions, and the like. Adjustments can be made to the process parameters by those of ordinary skill in the art, taking into account these factors. Helpful guidance is provided in a number of references, such as "Recycling of Superalloy Scrap Through Electro Slag Remelting", by V V. Prasad et al, ISIJ International, Vol. 36 (1966), No. 12, pp. 1459-1464, which is incorporated herein by reference.

A variety of metals and metal alloys can be produced or refined according to this invention. Non-limiting examples are those which comprise at least one element selected from the group consisting of titanium, nickel, aluminum, tin, antimony, beryllium, boron, gallium, molybdenum, niobium, tantalum, thorium, zirconium, vanadium, iridium, osmium, rhenium, uranium, and rare earth elements. Appropriate precursors (e.g., halide salts) which can be used as raw materials for these elements are known in the art. In the case of titanium materials, the raw materials may constitute various precursors which can be converted to common alloys, such as titanium-vanadium and titanium-vanadium-aluminum products. Examples of suitable precursors in those instances are aluminum chloride and vanadium chloride, in addition to a titanium precursor like $TiCl_4$.

In another embodiment of this invention, at least one non-consumable electrode is incorporated into the ESCH system. The primary function of the non-consumable electrode is to serve as an electrical conductor which supplies energy and heat to desired locations within the ESCH system. Usually, the non-consumable electrode is very effective as a second heating source for the slag.

The non-consumable electrode can be in a variety of forms. In the embodiment illustrated in FIG. 5, non-consumable electrode 100 is the upper section of hearth 102 and ingot mold 104. These sections may be in the form of a unitary structure, or in the form of two, divided sections, as described above. The hearth and the mold are separated by flow-over dam 117. Non-consumable electrode 100 can be connected to power supply 106 by conductor 108. (Conductor 105 carries heating current from power supply 107 to consumable electrode 109, in the manner described for FIG. 2).

Figure 5:
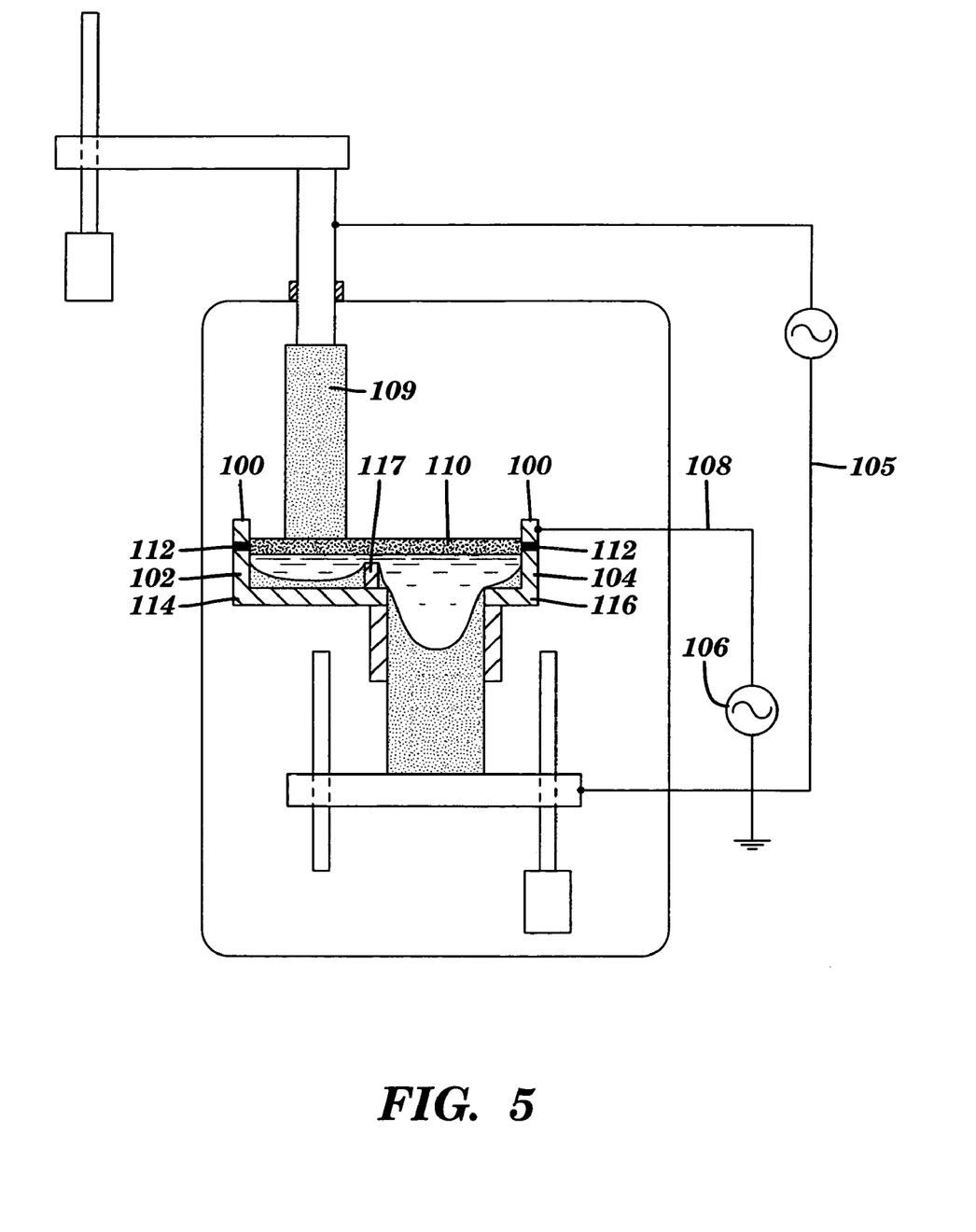
FIG. 5 is a schematic illustration of an additional embodiment of the electroslag-cold hearth apparatus.

The non-consumable electrode is in contact with slag 110, and provides the desired amount of thermal energy to the slag, by way of adjustment of the voltage at power supply 106 (and any additional power supply). An insulator 112 is employed to electrically separate non-consumable electrode 100 from the lower sections 114, 116 of hearth 102 and mold 104, respectively. The insulator can be in a variety of forms, e.g., layers of a heat-resistant material which is generally non-conductive (electrically). Suitable insulators include ceramics and mineral-based materials such as mica or asbestos. Moreover, different power supply systems are possible, e.g., a single power supply instead of two. (Features not specifically labeled in FIG. 5 are generally identical to those in other embodiments, e.g., that of FIG. 2).

Figure 6:
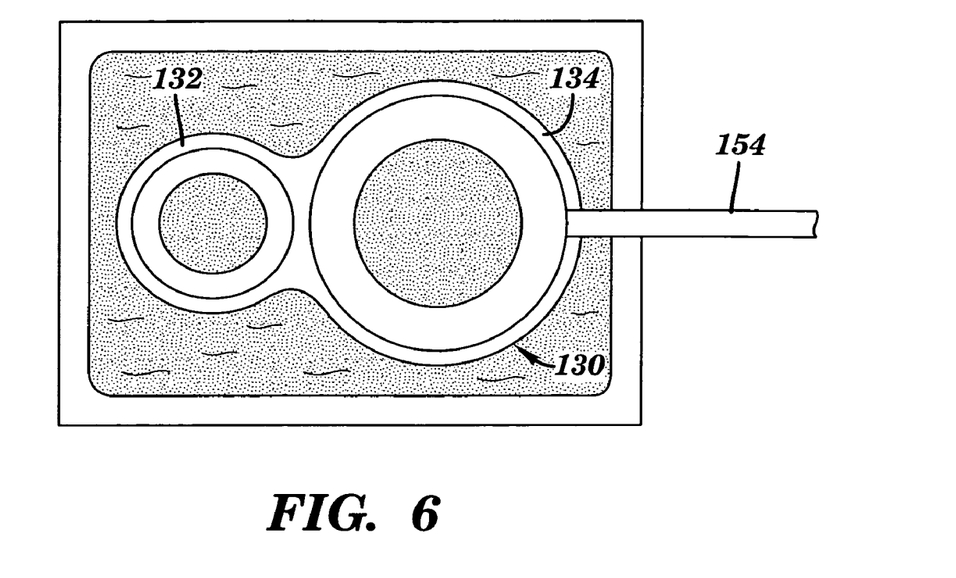
FIG. 6 is a top-view of a non-consumable electrode situated in an electroslag-cold hearth apparatus.
Figure 7:
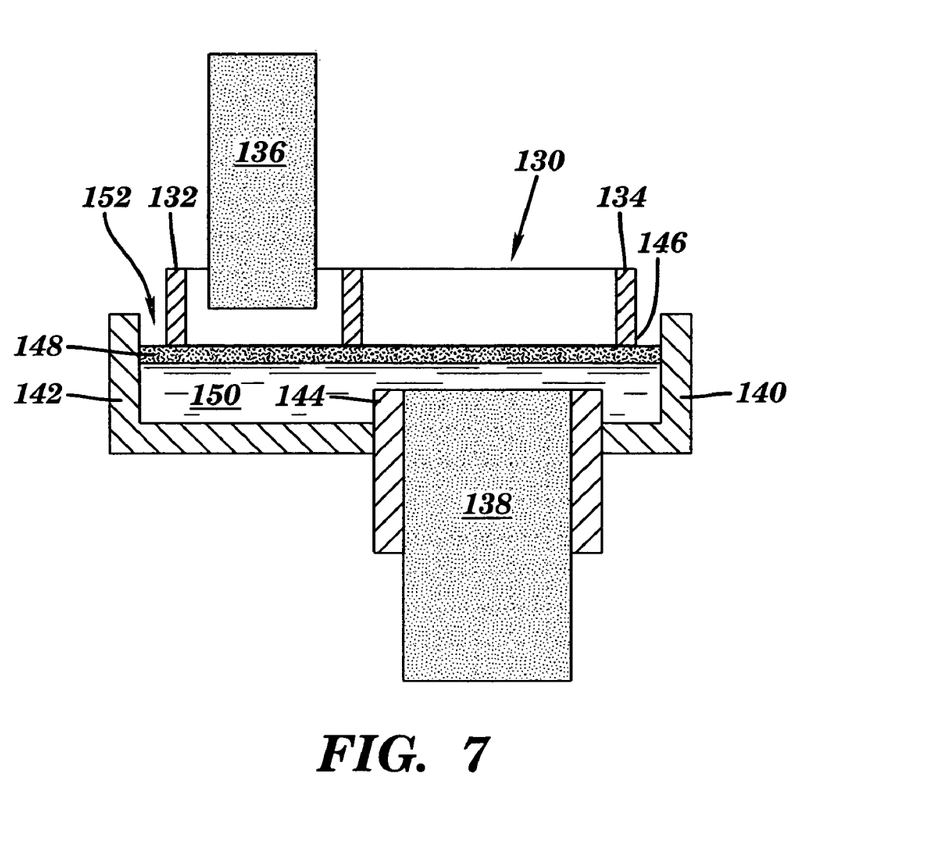
FIG. 7 is a side-perspective of a portion of the electroslag-cold hearth apparatus depicted in FIG. 6.

As an alternative, the non-consumable electrode can be in the form of a separate plate or frame, i.e., separate from the crucible, as depicted in FIGS. 6 and 7. (These figures depict the portion of the ESCH system relevant to the description of this embodiment). Such a frame is usually formed of an electrically conductive material, such as graphite or copper. The conductive material may be coated or capped with a refractory material such as tungsten or molybdenum, to protect it from any possible degradation in the slag. The frame can also be in different shapes, depending in part on the particular ESCH system employed.

In FIG. 6, the frame (non-consumable electrode) 130 is viewed from the top, and is seen to be formed by two rings 132 and 134. As depicted in the side-view of FIG. 7, ring 132 has a diameter sufficient to surround consumable electrode (feed-electrode) 136. Ring 134 has a diameter sufficient to surround the "product" being formed, i.e., ingot 138. (Ring 134 is physically located above the ingot, as shown in the figure. Therefore, this ring need not be open. It could be a round, solid disc, for example. However, an advantage of the open ring is that there is no material above ingot 138 which could fall and contaminate the ingot). As in the other embodiments, ingot mold 140 is laterally off-set from hearth 142, so that any inclusions or other contaminants melting from electrode 136 will not fall directly into the ingot mold. Ingot mold 140 and hearth 142 are separated from each other by flow-over dam 144, as described previously.

As depicted in FIG. 7, the lower section 146 of frame 130 (i.e., the non-consumable electrode) is in contact with slag 148. The slag lies on top of liquid metal 150, formed by the melting electrode. In this embodiment, an annulus 152 separates non-consumable electrode 130 from ingot mold 140 and hearth 142. Therefore, an insulator is not necessary.

As shown in FIG. 6, electrical power to the non-consumable electrode is provided by conductor 154, attached to a power supply (not shown).

There are many variations to the structure and location of the non-consumable electrode. As an example, frame 130 could be generally rectangular, or irregular-shaped. Moreover, the non-consumable electrode could have many contact sites with the slag, e.g., by way of a number of electrodes which protruded downward into the slag. Furthermore, multiple non-consumable electrodes could be employed, each connected to a separate conductor, and/or to a separate power source. The various non-consumable electrodes could be positioned to contact the slag at a variety of different locations, to enhance uniform heating and efficient energy use.

The use of a non-consumable electrode as in FIG. 7 permits thermal energy to be concentrated relatively close to the upper portion of ingot 138. In this manner, heat can be concentrated at the outer-diameter surface of the ingot. The concentrated heat can result in a relatively smooth outer surface, with little or no "lapping" in the surface region. Enhancement of the surface region by way of this feature can eliminate additional processing steps. For example, it may be possible to reduce or eliminate laborious machining or re-melting steps, which can waste product material.

A non-limiting example of another type of non-consumable electrode is provided in U.S. Pat. No. 4,185,682 (Ksendzyk et al), which is incorporated herein by reference. In that disclosure, the base plate of an electroslag mold is connected to a power source. An upper sleeve which forms part of the mold wall is also connected to the power source, completing the circuit. (The sleeve is insulated from other sections of the mold). The upper sleeve and the base-plate function as a pair of non-consumable electrodes. Those of ordinary skill in the art could readily adapt such an arrangement for use in the present invention, based on the teachings herein.

In some embodiments, the non-consumable electrode can be raised or lowered, to vary the depth at which it is immersed in the slag. This feature can often be important, in view of the fact that voltage control in the ESCH system can be difficult, due to slag temperature, hearth geometry, and the like. Variation of the immersion depth allows direct control of the circuit impedance, i.e., resistance. When this mechanism is coupled with electric current control to the ESCH system, the slag temperature can be efficiently monitored and adjusted.

Many techniques are available for raising or lowering the non-consumable electrode. For example, vertical movement of non-consumable electrode 130 of FIGS. 6 and 7 can be controlled by any conventional lifting device. An exemplary mechanism is depicted in the referenced Ksendzyk patent, in which a lifting mechanism is attached to the non-consumable electrode with a driving carriage. The driving carriage could be movably-mounted on a vertical column.

Figure 8:
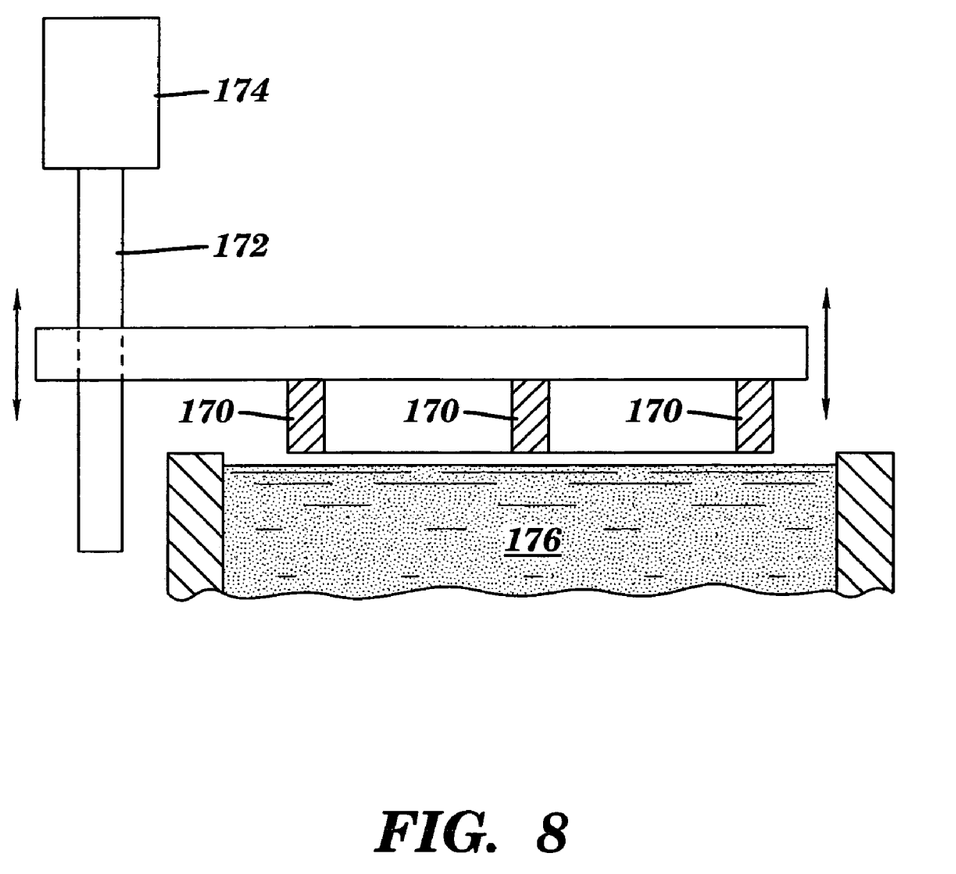
FIG. 8 is an illustration of a mechanism for moving a non-consumable electrode which is part of an electroslag-cold hearth apparatus.

One illustration of a possible mechanism is provided by FIG. 8, which generally depicts (in cross-section) a portion of an ESCH system. Non-consumable electrode 170 is mounted on a servo-activated ram 172. Ram 172 is put into motion by motor 174, in one of the directions indicated by the arrows. The motor can be powered by any suitable source. Monitoring system impedance allows control of the immersion of non-consumable electrode 170 in slag 176. (If multiple non-consumable electrodes are employed, the movement of each could be controlled by a similar mechanism).

Figure 9:
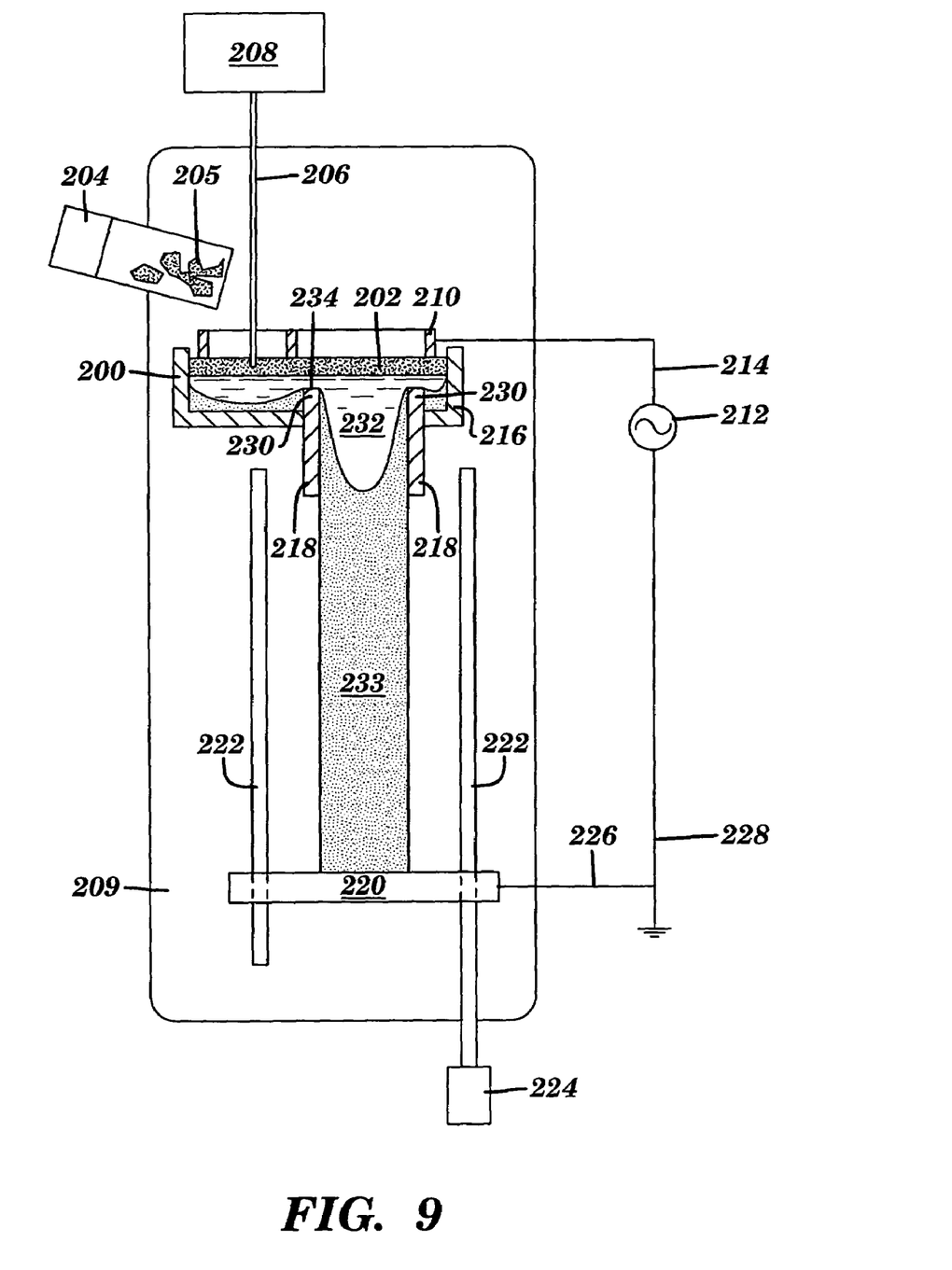
FIG. 9 is a schematic illustration of an electroslag-cold hearth apparatus for producing a metal product.

As mentioned above, another embodiment of this invention is directed to a method for producing specialty metals like titanium and titanium alloys. While the embodiment includes certain inventive features described above, many variations in the remaining features of the production system are possible. FIG. 9 provides one non-limiting illustration of a production apparatus suitable for carrying out the present invention. In general, systems of this type are electrolytic, in that the desired metal is electrochemically extracted from salts of the metal. (Related compounds may also be used, e.g., hydrates). U.S. Pat. No. 6,074,545 (Ginatta), mentioned above and incorporated herein by reference, provides one example of an electrolytic process. In such a process, titanium is produced by the electrolytic reduction of titanium tetrachloride into chlorine and titanium metal, in the liquid state.

The system of FIG. 9 includes a hearth 200, which can be similar to those described previously, e.g., metal-walled and water-cooled. A layer of slag 202 resides in the upper portion of the hearth, and serves as the electrolyte in the system. As in other embodiments, the composition of the slag depends in part on the metal being produced. Usually, the slag comprises at least one calcium halide, and may include calcium metal as well.

At least one source of raw material communicates with the hearth. For example, feed system 204 can supply source materials 205 to the hearth in liquid or solid states. A wide variety of conventional feed mechanisms can be used, and will depend in part on the type and form of source material (e.g., its physical state).

As described in Ginatta, typical source materials for titanium include $TiCl_4$, $TiF_3$, $TiBr_4$, $TiI_4$, and TiC. Those compounds which can be fed in the liquid or gaseous state (e.g., $TiCl_4$) can be directed into the system via a suitable passageway, e.g., some form of tubing 206, connected to a gas/liquid source 208. Some of the compounds are in the gas state at elevated temperatures, e.g., above about 137° C. in the case of $TiCl_4$. However, at room temperature, the compounds may be liquids, which are very conveniently handled by a metering pump. The liquid vaporizes as it is directed into the slag/electrolyte.

As in other embodiments, the electrolytic system of FIG. 9 is usually contained within a chamber 209. The chamber provides the system with an inert atmosphere. The inert gas can serve to control the partial pressure of nitrogen above the slag/electrolyte 202. When source materials like the $TiCl_4$ are electrolytically reduced, halide gasses such as chlorine will be produced. These gasses can be removed by any conventional evacuation system, which is not shown in the figure.

As in previous embodiments, a variety of techniques can be used to heat the slag. In FIG. 9, slag/electrolyte 202 is heated by way of electric current supplied to non-consumable electrode 210. In electrolytic systems of this type, i.e., where some or all of the raw material is halide-based, the electric current is preferably (but not always) direct current (DC). Non-consumable electrode 210 is connected to power supply 212 by conductor 214. In this system, current flows from the power supply, through electrode 210, to slag/electrolyte 202 and underlying liquid metal 232. Current then continues to flow through ingot 233 and base-plate 220, and back to the power supply via conductors 226 and 228. However, many variations to this power route are possible.

Slag 202 is maintained at a temperature sufficient to extract the desired metal from its-salt. The slag also functions to dissolve any solid foreign bodies from the metallic raw material, e.g., high-nitrogen inclusions, as described previously. The specific slag temperature will vary, depending in part on the source metal or alloy. The slag must be maintained at a temperature which is at least as high as the melting point of the source material. As described in Ginatta for systems involving the electrolytic production of titanium, there are thermochemical advantages to carrying out the process at around the melting point of titanium (e.g., about 1650° C. to about 1700° C.).

The electrolytic system includes an ingot mold 216. The ingot mold can vary in shape and composition, as described previously. It is usually fluid-cooled. The mold is open-ended at its lower end, terminating with lower section 218, as shown in FIG. 9. Base-plate 220 can be lowered as the growing ingot 233 solidifies. Travel mechanism 222, which can be controlled by any suitable motor, can be used for this purpose, as could a variety of other mechanisms.

As in the embodiments for metal refining, ingot mold 216 is separated from hearth 200 by a flow-over dam 230. Liquid metal 232 (i.e., the product of the electrolytic process) is allowed to flow from hearth 200, over the top 234 of the dam, and into ingot mold 216. The dam effectively prevents high-density inclusions from entering the ingot mold, as described previously. The shape and size of the flow-over dam can vary significantly, as in other embodiments. In the illustration of FIG. 9, the flow-over dam is the upper section of the wall of the ingot mold.

As in the refining embodiments, ingot mold 216 is laterally off-set from hearth 200. The degree to which these elements are off-set may vary, as long as any feed source of raw material which may include impurities is not located directly over mold 216. Thus, inclusions and other foreign bodies will not be transferred into the ingot mold.

As described previously, the ability to prevent undesirable materials from becoming incorporated into the solidifying product/ingot can be a very important processing advantage. In the case of the electrolytic production of metal, the "off-set feature" is especially advantageous when source materials 205 are used in addition to the gas/liquid source 208. For example, if material 205 is solid revert metal being recycled, the possibility of foreign bodies being introduced to hearth 200 is considerably high. The present invention effectively isolates those bodies from the metal product.

Figure 10:
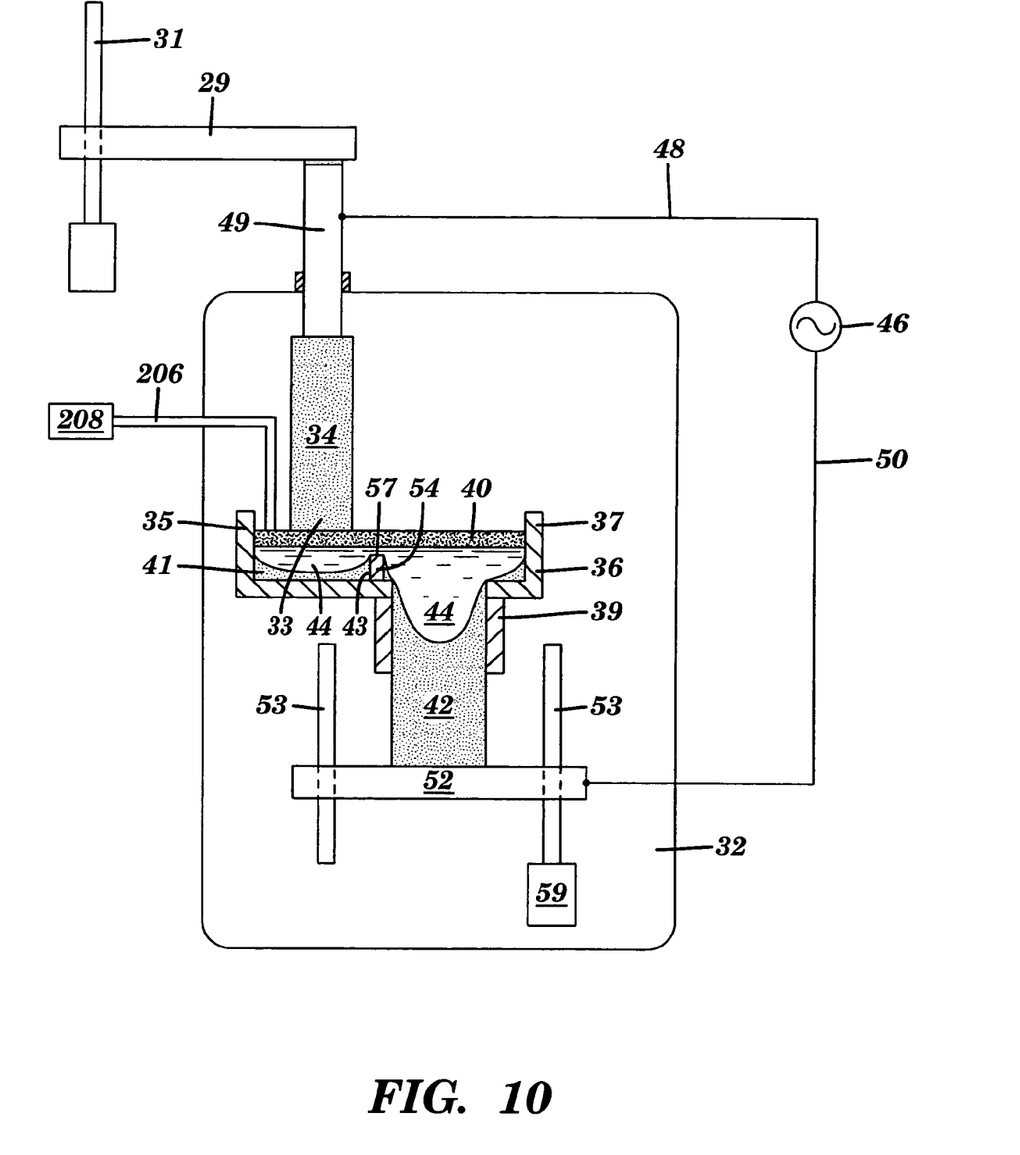
FIG. 10 is a schematic illustration of an electroslag-cold hearth apparatus for both refining and producing a metal product.

In another embodiment of the invention, the electroslag-cold hearth system can be used to simultaneously refine a metal and produce new metal from a suitable raw material. An exemplary ESCH system for this purpose is illustrated in FIG. 10. (Elements in the figure which are common to previous figures are generally provided with the same element numbers). As in the embodiment of FIG. 2, the system includes a consumable electrode 34, along with the underlying hearth 35. The hearth is separated from the off-set ingot mold 36 by flow-over dam 54. The hearth contains molten slag 40, which is heated by current coming from conductor 48, through the consumable electrode. (The current is usually DC, but can also be operated in the AC mode, with a DC off-set, as mentioned previously). The heated slag causes the lower end 33 of electrode 34 to melt, forming liquid metal pool 44.

The ESCH system of FIG. 10 further includes at least one gas or liquid-source of raw material 208. In the case of titanium alloys, the source is frequently a halide material such as $TiCl_4$. As described for other embodiments (FIG. 9), these source materials can be fed into the system through suitable tubing 206, which terminates within slag 40. As the feed material enters the slag, electrolytic reduction of the raw material source takes place, and the molten product accumulates in the hearth as a portion of the metal pool 44.

Thus, the metal pool is "fed" by both the product of the electrolytic reaction and the melting of electrode 34. The composition of each material source (electrode 34 and raw material 208) can be varied, to obtain the specific alloy which is desired. Moreover, the ESCH system of FIG. 10 can also include a separate source of metal source material, e.g., one which feeds revert metal or virgin metal material, via any suitable feeding station, as described for FIG. 4. This feeding source can be used in place of, or in addition to, electrode source 34.

This invention has been described in terms of certain embodiments. However, it is not intended that the invention be limited to the above description. Accordingly, various modifications, adaptations, and alternatives may occur to one skilled in the art without departing from the spirit and scope of the claimed inventive concept. All of the patents, articles, and texts which are mentioned above are incorporated herein by reference.

What is claimed:

1. An electroslag-cold hearth system for refining or producing a metal, comprising:
    a cold hearth vessel for melting and holding a pool of molten liquid metal;
    a liquid slag layer floating on top of the pool of molten liquid metal;
    a source of metal comprising a consumable electrode;
    a non-consumable electrode in contact with the liquid slag layer, wherein a portion of the non-consumable electrode surrounds a portion of the consumable electrode;
    an ingot mold for receiving molten metal from the pool of molten metal, laterally off-set from the source of metal;
    a power supply for electrically heating the liquid slag layer; and
    a flow-over dam between the cold hearth vessel and the ingot mold.

2. The system of claim 1, further including means for advancing the consumable electrode toward and into contact with the liquid slag layer.

3. The system of claim 1, wherein the source of metal comprises at least one of metal revert and virgin metal material.

4. The system of claim 1, wherein the cold hearth vessel comprises a liquid-cooled reservoir.

5. The system of claim 4, wherein the cold hearth vessel is a water-cooled metal reservoir.

6. The system of claim 1, wherein the liquid slag layer comprises at least one material selected from the group consisting of calcium metal, calcium halides, calcium oxide, and mixtures thereof.

7. The system of claim 1, wherein the flow-over dam comprises a wall which permits the flow of liquid metal into the ingot mold, but substantially prevents the flow of inclusions into the ingot mold.

8. The system of claim 7, wherein the wall comprises a metallic material, and is liquid-cooled.

9. The system of claim 1, wherein the power supply comprises an electric supply means adapted to supply current to the consumable electrode and through the liquid slag layer in the cold hearth vessel, thereby keeping the liquid slag layer molten, while melting an end of the consumable electrode in contact with the liquid slag layer.

10. The system of claim 1, further including means for supplying current to the liquid slag layer through the non-consumable electrode.

11. The system of claim 10, wherein the means for supplying current comprises a second power supply.

12. The system of claim 1, wherein the non-consumable electrode comprises a portion of the cold hearth vessel and the ingot mold, and wherein the non-consumable electrode is electrically separated from the cold hearth vessel and the ingot mold by an insulator.

13. The system of claim 1, wherein the non-consumable electrode is mounted on a structure which allows the non-consumable electrode to move relative to the liquid slag layer.

14. The system of claim 13, wherein the electrically conductive material comprises graphite or copper material.

15. The system of claim 13, wherein the electrically conductive material is covered or capped by a refractory metal.

16. The system of claim 1, wherein the metal comprises at least one element selected from the group consisting of titanium, nickel, aluminum, tin, antimony, beryllium, boron, gallium, molybdenum, niobium, tantalum, thorium, zirconium, vanadium, iridium, osmium, rhenium, uranium, and rare earth elements.

17. The system of claim 1, wherein the metal comprises titanium or a titanium alloy.

18. The system of claim 17, wherein the titanium alloy comprises titanium and at least one metal selected from the group consisting of aluminum and vanadium.

19. A system according to claim 1, further comprising a feed system for supplying a source material to the liquid slag layer.

20. The system of claim 19, wherein the source material comprises at least one salt.

21. The system of claim 20, wherein the at least one salt comprises a titanium salt.

22. The system of claim 19, wherein the source material comprises a liquid or a gas, and wherein the source material communicates with the liquid slag layer through a passageway.

23. The system of claim 19, wherein the source material comprises a metal material.

24. The system of claim 23, wherein the metal material comprises titanium or a titanium alloy.

25. The system of claim 23, wherein the metal material comprises at least one of metal revert and virgin metal material.

26. An electroslag-cold hearth system for refining or producing a metal or metal alloy, comprising a cold hearth vessel capable of holding a pool of liquid metal and an overlying slag layer; a power supply for electrically heating the slag layer; an ingot mold that communicates with the cold hearth through a flow-over dam that allows the liquid metal to flow from the hearth to the ingot mold while substantially preventing the flow of inclusions to the ingot mold; a consumable electrode situated above the cold hearth and laterally off-set from the ingot mold; and a non-consumable electrode in contact with the slag layer, wherein the non-consumable electrode comprises a portion of the cold hearth vessel and the ingot mold, and wherein the non-consumable electrode is electrically separated from the cold hearth vessel and the ingot mold by an insulator.

27. An electroslag-cold hearth system for refining titanium or a titanium alloy, comprising:
    a cold hearth vessel for melting and holding a pool of molten liquid titanium or titanium alloy;
    a calcium-based liquid slag layer overlying the pool of molten liquid titanium or titanium alloy;
    a consumable electrode formed of titanium or titanium alloy, having an end in contact with the liquid slag layer;

an ingot mold for receiving the molten titanium or titanium alloy, laterally off-set from the consumable electrode, and situated below a portion of the liquid slag layer;

a power supply for electrically heating the liquid slag layer and the consumable electrode;

a flow-over dam between the cold hearth vessel and the ingot mold; and a non-consumable, electrically conductive electrode, in contact with the liquid slag layer, and electrically coupled to the power supply for providing additional thermal energy to the slag layer.

28. An electroslag-cold hearth system for electrolytically producing titanium or a titanium alloy, comprising:

a cold hearth vessel for melting and holding a pool of molten liquid titanium or titanium alloy;

a calcium-based liquid slag layer overlying the cold hearth vessel;

a source for containing at least one titanium salt in liquid or gaseous form, wherein the salt can be electrochemically reduced to the titanium or titanium alloy when introduced into the liquid slag layer;

an ingot mold for receiving the molten titanium or titanium alloy, laterally off-set from the cold hearth vessel, and communicating therewith;

a power supply for electrically heating the liquid slag layer;

a flow-over dam between the cold hearth vessel and the ingot mold;

a consumable electrode formed of titanium or titanium alloy, and positioned so that it can be lowered into contact with the liquid slag layer, to allow for the refining of the titanium or titanium alloy while additional titanium or titanium alloy material is being electrolytically produced from the salt; and a non-consumable, electrically conductive electrode, in contact with the slag layer, and electrically coupled to the power supply for providing additional thermal energy to the liquid slag layer.

29. The electroslag-cold hearth system of claim 28, further comprising a feed system for directing titanium-based revert material or virgin titanium material to the liquid slag layer.

* * * * *